(12) United States Patent
Sugaya

(10) Patent No.: US 10,817,923 B2
(45) Date of Patent: Oct. 27, 2020

(54) INFORMATION PROVIDING SYSTEM, INFORMATION PROVIDING APPARATUS, INFORMATION PROVIDING METHOD, AND PROGRAM

(71) Applicant: OPTiM Corporation, Saga-shi (JP)

(72) Inventor: Shunji Sugaya, Tokyo (JP)

(73) Assignee: OPTIM CORPORATION, Saga-Shi (JP)

( * ) Notice: Subject to any disclaimer, the term of this patent is extended or adjusted under 35 U.S.C. 154(b) by 2 days.

(21) Appl. No.: 15/531,830

(22) PCT Filed: Oct. 6, 2016

(86) PCT No.: PCT/JP2016/079752
§ 371 (c)(1),
(2) Date: May 31, 2017

(87) PCT Pub. No.: WO2018/066102
PCT Pub. Date: Apr. 12, 2018

(65) Prior Publication Data
US 2019/0340669 A1    Nov. 7, 2019

(51) Int. Cl.
*G06Q 30/00* (2012.01)
*G06Q 30/06* (2012.01)
*G06F 16/9535* (2019.01)
*G06F 16/9538* (2019.01)
*G06K 9/46* (2006.01)

(52) U.S. Cl.
CPC ..... *G06Q 30/0629* (2013.01); *G06F 16/9535* (2019.01); *G06F 16/9538* (2019.01); *G06K 9/46* (2013.01)

(58) Field of Classification Search
None
See application file for complete search history.

(56) References Cited

U.S. PATENT DOCUMENTS 9,720,934 B1 *   8/2017   Dube ............... G06F 16/583
2002/0087426 A1  7/2002   Shiitani
2012/0259741 A1 * 10/2012   Iwabuchi ........... G06Q 30/06
                                                   705/27.1

(Continued)

FOREIGN PATENT DOCUMENTS

JP    2002-202974    7/2002
JP    2003-044756    2/2003

(Continued)

OTHER PUBLICATIONS

Nodari, A., A Mobile Visual Search Application for Content Based Image Retrieval in the Fashion Domain, Jun. 1, 2012, 2012 10th International Workshop on Content-Based Multimedia Indexing, pp. 1-6 (Year: 2012).*

*Primary Examiner* — Michael Misiaszek
*Assistant Examiner* — Timothy J Kang
(74) *Attorney, Agent, or Firm* — Lex IP Meister, PLLC

(57) ABSTRACT

An image acquiring unit acquires an image representing a product. A specifying unit specifies the product by analyzing the acquired image. A page acquiring unit acquires a page from at least one server apparatus providing the page including information of the specified product. A display unit displays a screen 300A in which page images 301, 302, and 303 corresponding to the acquired pages are arranged side by side.

16 Claims, 15 Drawing Sheets

(56) References Cited

U.S. PATENT DOCUMENTS

| | | |
|---|---|---|
| 2013/0010103 A1 | 1/2013 | Ihara |
| 2015/0019346 A1 | 1/2015 | Masuko |
| 2016/0224832 A1* | 8/2016 | Madey ............... G06K 9/00979 |

FOREIGN PATENT DOCUMENTS

| | | |
|---|---|---|
| JP | 2003-122757 | 4/2003 |
| JP | 2009-223456 | 10/2009 |
| JP | 2011-227875 | 11/2011 |
| JP | 2013-210783 | 10/2013 |
| WO | 2011/049209 | 4/2011 |

* cited by examiner

FIG. 4

| User ID | Name | Address | Telephone Number | User's Attribute Info |
|---------|------|---------|------------------|-----------------------|
| 001 | Tarou Yamada | Tokyo ... | 03-XXXX-XXXX | Sex: Male<br>Age: Thirties<br>Favorite EC Site: EC Site A |

| Date & Time | User ID | ID Info of EC Site | ID Info of Product | |
|---|---|---|---|---|
| 2016/9/1 | 001 | EC Site A | Carbonated Beverage Z | ~120 |
| ... | ... | ... | ... | |

FIG. 11

| ID Info of Target Product | ID Info of Corresponding Product |
|---|---|
| Beverage X | New Beverage X |
| ... | ... |

140

INFORMATION PROVIDING SYSTEM, INFORMATION PROVIDING APPARATUS, INFORMATION PROVIDING METHOD, AND PROGRAM

TECHNICAL FIELD

The present invention relates to an information providing system, an information providing apparatus, an information providing method, and a program.

BACKGROUND ART

Techniques of supporting purchase of a product by electronic commerce are known. For example, Patent Document 1 describes a technique of statistically processing selling prices of products that are being sold at a plurality of shop sites existing on the Internet and generating a web page displaying the result.

PRIOR ART DOCUMENT

Patent Document

Patent Document 1: Japanese Patent Application Publication No. 2009-223456

SUMMARY OF THE INVENTION

Technical Problem

However, in the technique described in Patent Document 1, an operation of searching for the product, such as entering a keyword for searching for the product, should be performed in order to browse information such as the selling price of the product. Such operation makes a user feel annoying. Further, when the user does not recognize information for identifying the product, it becomes difficult to search for the product. When the user cannot search for the product, the user cannot browse the information on the product.

An object of the present invention is to allow the user to browse a page including the information on the product even if the user does not recognize the information for identifying the product.

Technical Solution

The present invention provides an information providing system including an image acquiring unit that acquires an image representing a product, a specifying unit that specifies the product by analyzing the acquired image, a page acquiring unit that acquires a page from at least one server apparatus providing the page including information of the specified product, and a display unit that displays a screen in which a page image corresponding to the acquired page is arranged side by side.

Effects of the Invention

According to the present invention, a user can browse a page including information of a product even if the user does not recognize information for identifying the product.

BRIEF DESCRIPTION OF THE DRAWINGS

FIG. 4 is a diagram showing an example of user information 110.

FIG. 6 is a diagram showing an example of purchase history information 120.

FIG. 11 is a diagram showing an example a conversion table 140.

DESCRIPTION OF REFERENCE NUMBERS

1: information providing system, 10: web server apparatus, 20: terminal apparatus, 30: processing server apparatus, 101: image acquiring unit, 102: specifying unit, 103: selecting unit, 104: page acquiring unit, 105: generating unit, 106: display control unit

DETAILED DESCRIPTION OF THE EMBODIMENTS

1. Structure (1) Structure of Information Providing System 1

Figure 1:
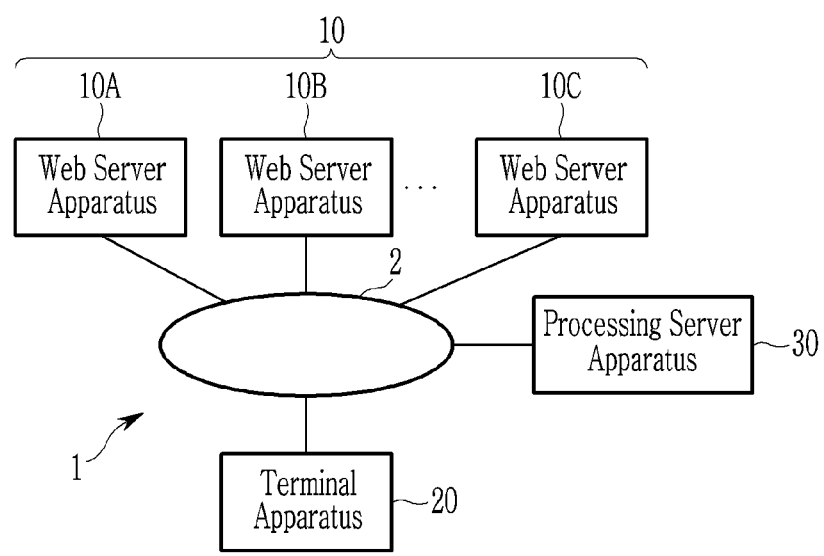
FIG. 1 is a diagram showing an example of a structure of an information providing system 1.

FIG. 1 is a diagram showing an example of a structure of an information providing system 1 according to a present embodiment. The information providing system 1 has a function of, when the user inputs an image (hereinafter referred to as an "input image") indicating a desired product, providing pages of the product included in one or more EC (electronic commerce) sites to a user by arranging the pages side by side. The product may include provision of a service as well as goods.

The information providing system 1 includes a plurality of web server apparatuses 10 (an example of a server apparatus), a terminal apparatus 20, and a processing server apparatus 30. The plurality of web server apparatuses 10, the terminal apparatus 20, and the processing server apparatus 30 are connected via a communication line 2. The communication line 2 is, for example, the Internet. However, the communication line 2 is not limited to the Internet, and may include the Internet and another communication line or may be a communication line other than the Internet. Further, the number of the web server apparatuses 10, the number of the terminal apparatus(es) 20, and the number of the processing server apparatus(es) 30 are merely examples and are not limited thereto. For example, the number of the web server apparatuses 10 may be more than or less than the number shown in FIG. 1. Furthermore, the number of the terminal apparatus(es) 20 may be plural.

The plurality of web server apparatuses 10 provide different EC sites, respectively. In this example, the web server apparatus 10A provides the EC site A, the web server apparatus 10B provides the EC site B, and the web server apparatus 10C provides the EC site C. Each EC site sells various products by electronic commerce. Each EC site includes a page (hereinafter referred to as a "product page") including information of each product. Each web server apparatus 10 stores a page database indicating the product page included in the EC site provided by that web server device 10 in advance.

Figure 2:
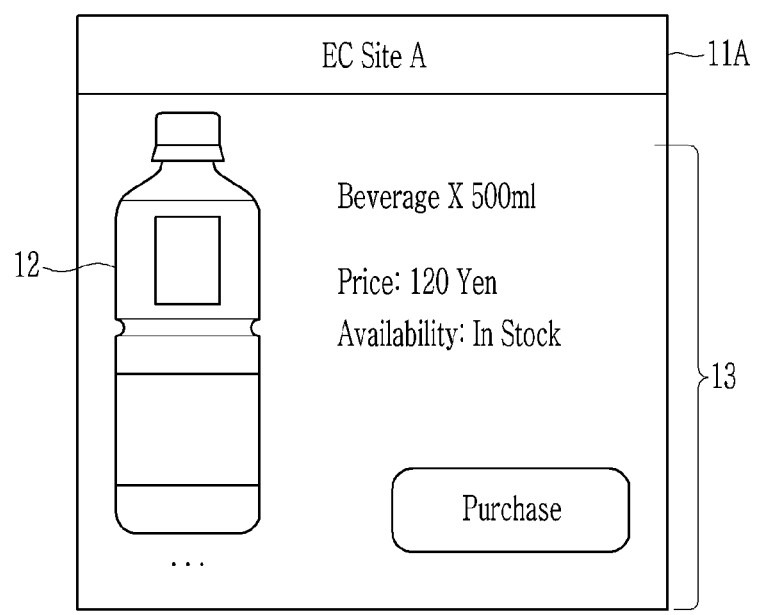
FIG. 2 is a diagram showing a product page 11A.

FIG. 2 is a diagram showing a product page 11A that is an example of a product page included in an EC site A. The product page 11A is a page of selling 500 ml beverage X. The product page 11A includes a product image 12 and product information 13. The product image 12 is an image representing a product. In this example, the product image 12 is a photographed image of the beverage X. The product information 13 is information explaining the product. The product information 13 includes, for example, a name of the product, a price of the product, availability of the product, a manufacturer's name or brand name of the product, a size or capacity of the product, and evaluation information of the product by other users. The product image 12 and the product information 13 are an example of information of the product. If the same product is sold at a plurality of EC sites, the price and availability of the product may differ depending on the EC site.

(2) Structure of Terminal Apparatus 20

Figure 3:
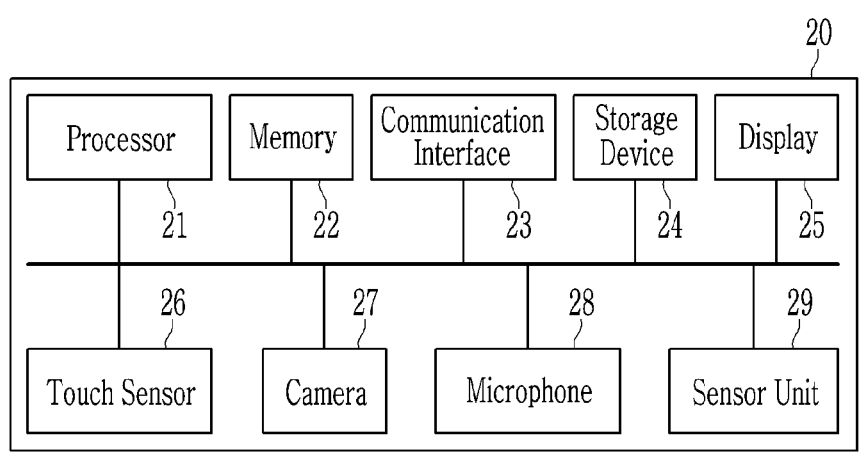
FIG. 3 is a diagram showing an example of a hardware structure of a terminal apparatus 20.

FIG. 3 is a diagram showing an example of a hardware structure of a terminal apparatus 20. The terminal apparatus 20 is used by a user and is used for inputting an input image and outputting a screen on which product pages are arranged side by side. As the terminal apparatus 20, for example, a mobile phone, a smartphone, a tablet terminal, or a client computer may be used. The terminal apparatus 20 includes a processor 21, a memory 22, a communication interface 23, a storage device 24, a display 25 (an example of display means), a touch sensor 26, a camera 27, a microphone 28, and a sensor unit 29.

The processor 21 controls each part of the terminal apparatus 20 by executing a program stored in the memory 22. For example, a central processing unit (CPU) is used as the processor 21. The memory 22 stores the program to be executed by the processor 21. For example, a read only memory (ROM) or a random access memory (RAM) is used as the memory 22.

The communication interface 23 is connected to a communication line 2 and performs data communication through the communication line 2. The storage device 24 stores various data and programs. For example, a flash memory or a hard disk drive is used as the storage device 24. The storage device 24 stores user information 110 in addition to a client program for causing the terminal apparatus 20 to execute processing on a client side.

FIG. 4 is a diagram showing an example of user information 110. The user information 110 is information regarding a user of the terminal apparatus 20. The user information 110 includes a user ID; a name, an address, and a telephone number of the user; and attribute information of the user.

The user ID is information for uniquely identifying the user. The user ID is determined, for example, by the user in advance. The user's name, address, telephone number, and attribute information are registered in advance, for example, by the user. The user's address may be, for example, an address of the user's home or an address of a place where the user mainly resides, such as a company where the user works. Further, the user's telephone number may be a telephone number of a telephone at the user's home or a telephone number of a mobile phone owned by the user. The user's attribute information is information indicating the attribute of the user. The user's attribute information includes information for determining a tendency of products purchased by the user or a tendency of EC sites used by the user. For example, the user's attribute information may include information indicating a favorite EC site of the user or information indicating an EC site where the user has account information, in addition to the sex and age of the user.

The user information 110 becomes usable by user authentication. For example, when authentication of the user identified by user ID "001" succeeds, user information 110 corresponding to the user ID "001" is permitted to be used. When a single terminal apparatus 20 is used by a plurality of users, user information 110 corresponding to the plurality of users may be stored in the storage device 24.

Referring to FIG. 3 again, the display 25 displays various kinds of information. For example, a liquid crystal display is used as the display 25. The touch sensor 26 detects a position of the display 25 on which a pointer such as a finger is touched. The display 25 and the touch sensor 26 form a touch panel. The camera 27 takes an image. For example, a digital still camera is used as the camera 27. The microphone 28 is used to input a voice.

The sensor unit 29 includes a position sensor and a fingerprint sensor. The position sensor measures a position of the terminal apparatus 20 and generates position information indicating the measured position. For example, a GPS (global positioning system) receiver is used as the position sensor. The GPS receiver measures the position of the terminal apparatus 20 based on signals received from GPS satellites. The fingerprint sensor generates fingerprint information by reading a fingerprint of the user. The fingerprint sensor is used for the user authentication.

(3) Structure of Processing Server Apparatus 30

Figure 5:
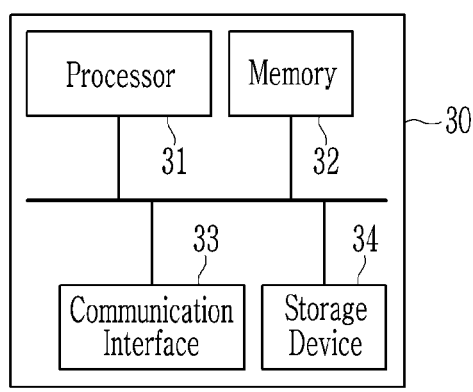
FIG. 5 is a diagram showing an example of a hardware structure of a processing server apparatus 30.

FIG. 5 is a diagram showing an example of a hardware structure of a processing server apparatus 30. The processing server apparatus 30 performs processing of analyzing an input image and specifying a product represented by the input image in response to a request of the terminal apparatus 20. The processing server apparatus 30 includes a processor 31, a memory 32, a communication interface 33, and a storage device 34.

The processor 31 controls each part of the processing server apparatus 30 by executing a program stored in the memory 32. For example, a CPU is used as the processor 31. The memory 32 stores the program to be executed by the processor 31. For example, a ROM or a RAM is used as the memory 32.

The communication interface 33 is connected to a communication line 2 and performs data communication through the communication line 2. The storage device 34 stores various data and programs. For example, a flash memory or a hard disk drive is used as the storage device 34. The storage device 34 stores purchase history information 120 in addition to a server program for causing the processing server apparatus 30 to execute processing on a server side.

FIG. 6 is a diagram showing an example of purchase history information 120. The purchase history information 120 is information indicating a history that the user has purchased products at an EC site provided by a web server apparatus 10. The purchase history information 120 includes a date and time, a user ID, identification information of the EC site, and identification information of the product.

The date and time is a date and time when the user has purchased the product. The date and time may include both a date and a time, or may include only a date. The user ID is information for uniquely identifying the user. For example, the user ID included in the user information may be used as the user ID. The identification information of the EC site is information for uniquely identifying the EC site at which the user has purchased the product. For example, a name of the EC site may be used as the identification information of the EC site. The identification information of the product is information for uniquely identifying the product purchased by the user. For example, a product name may be used as the identification information of the product, or a product number may be used as the identification information of the product.

The information included in the purchase history information 120 is acquired from a web server apparatus 10 providing an EC site or a terminal apparatus 20 and stored in the storage device 34, for example, each time the user purchases a product at that EC site. When the information providing system 1 includes a plurality of terminal apparatuses 20, the purchase history information 120 may include information indicating purchase history of a plurality of users using the plurality of terminal apparatuses 20.

(4) Functional Configuration of Information Providing System 1

Figure 7:
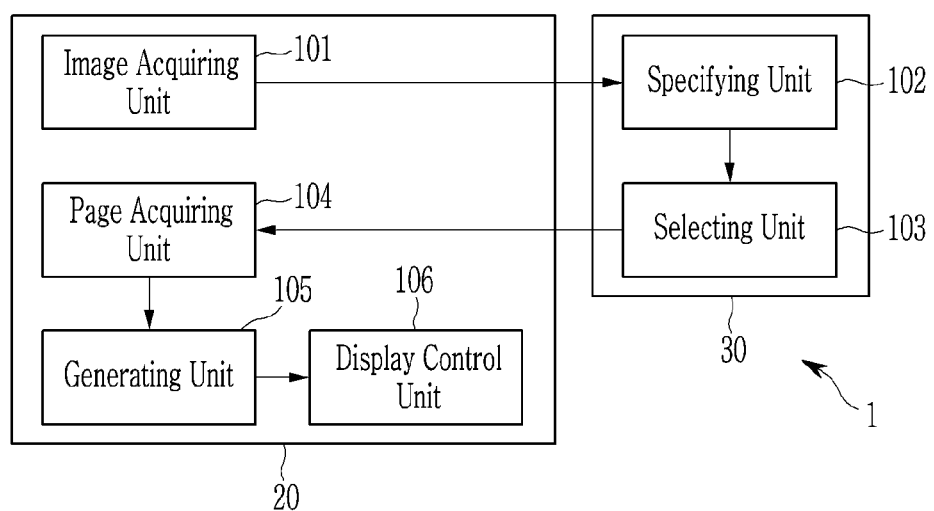
FIG. 7 is a diagram showing a functional configuration of an information providing system 1.

FIG. 7 is a diagram showing a functional configuration of an information providing system 1. The information providing system 1 functions as an image acquiring unit 101, a specifying unit 102, a selecting unit 103, a page acquiring unit 104, a generating unit 105, and a display control unit 106. In this example, the image acquiring unit 101, the page acquiring unit 104, the generating unit 105, and the display control unit 106 are implemented on a terminal apparatus 20. The specifying unit 102 and the selecting unit 103 are implemented on a processing server apparatus 30.

A. Image Acquiring Unit 101

The image acquiring unit 101 is realized, for example, by executing a client program stored in a memory 22 by a processor 21, or by a communication interface 23 under a control of the processor 21. The image acquiring unit 101 acquires an input image representing a product.

The input image may be, for example, an image of a product which is photographed by a camera 27. In this case, the input image may be acquired from the camera 27, or may be acquired from a storage device 24 when the image of the product which is photographed by the camera 27 is stored in the storage device 24.

As another example, the input image may be an image of a paper medium, such as a magazine, read by an image scanner. In this case, the input image may be acquired from the image scanner connected to the terminal apparatus 20, or may be acquired from the storage device 24 when the image read by the image scanner is stored in the storage device 24.

As yet another example, the input image may be an image stored in an external device. For example, the input image may be a site or web page provided or an image posted by an SNS (social networking service). In this case, the input image is acquired from the external device.

Further, the image acquiring unit 101 may acquire a plurality of input images representing the same product. The plurality of input images may be acquired, for example, by photographing the product from a plurality of different distances or directions by using the camera 27.

Figure 8:
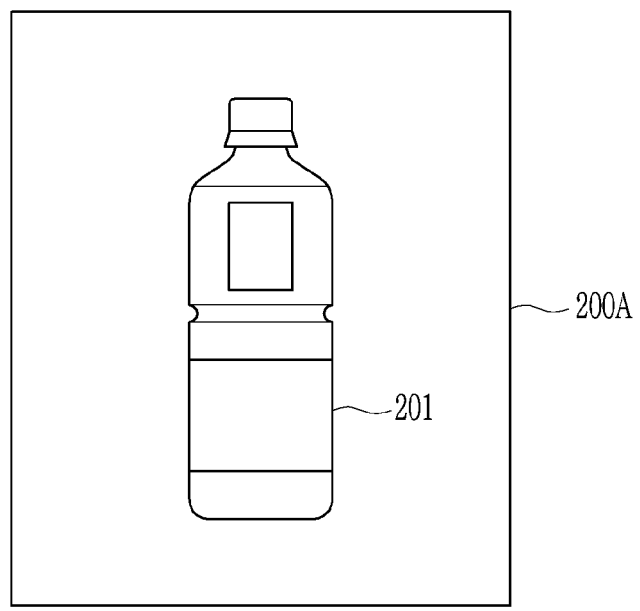
FIG. 8 is a diagram showing an input image 200A.

FIG. 8 is a diagram showing an input image 200A that is an example of an input example. The input image 200A includes a product image 201 representing 500 ml beverage X.

Figure 9:
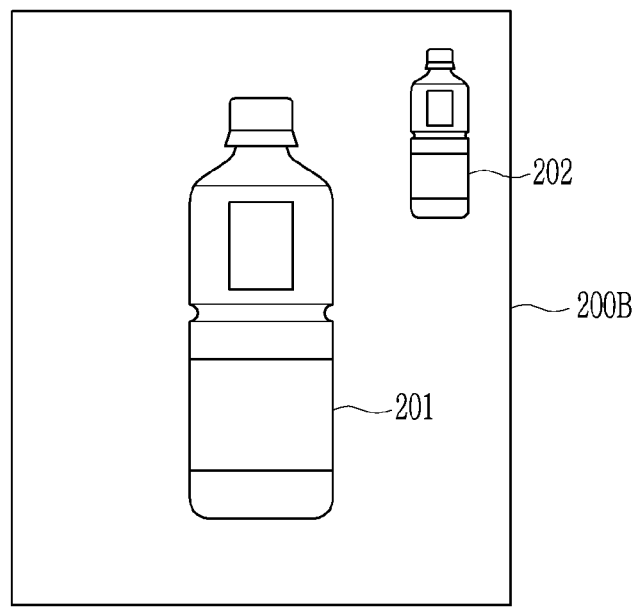
FIG. 9 is a diagram showing an input image 200B.

FIG. 9 is a diagram showing an input image 200B that is another example of an input example. The input image 200B includes the product image 201 representing the 500 ml beverage X and a product image 202 representing another 500 ml beverage Y.

B. Specifying Unit 102

The specifying unit 102 is realized, for example, by executing a server program stored in a memory 32 by a processor 31. The specifying unit 102 specifies a product represented by an input image by analyzing the input image acquired by the image acquiring unit 101.

The analysis of the input image is performed, for example, by using an image recognition technique such as pattern matching. The pattern matching compares an input image with a template image and detects a portion in the input image where the degree of similarity with the template image is equal to or larger than a threshold value. The threshold value is set to, for example, a value that can allow products indicated by these images to be considered to be the same. When the portion is detected where the degree of similarity with the template image is equal to or larger than the threshold value, the product represented by the template image is specified.

For example, a product image included in a product page of an EC site may be used as the template image. In this case, the template image may be acquired from the web server apparatus 10 and stored in the storage device 34 in advance. Alternatively, when the image analysis is performed, the template image may be acquired from the web server apparatus 10 and stored in the storage device 34.

When a character is included in the input image, the character may be recognized by using a well-known character recognition technique. In this case, the product may be specified based on, for example, a result of pattern matching and the recognized character.

In the example shown in FIG. 8, the degree of similarity between the product image 201 included in the input image 200A and a template image representing the 500 ml beverage X is equal to or larger than the threshold value. In this case, the 500 ml beverage X is specified.

In the example shown in FIG. 9, the degree of similarity between the product image 201 included in the input image 200B and the template image representing the 500 ml beverage X is equal to or larger than the threshold value. In addition, the degree of similarity between the product image 202 included in the input image 200B and the template image representing the 500 ml beverage Y is equal to or larger than the threshold value. In this case, both the 500 ml beverage X and the 500 ml beverage Y are specified.

Further, when a plurality of input images representing the same product are acquired by the image acquiring unit 101, the specifying unit 102 may specify the product by analyzing the input images. In this case, for example the product recognized by analyzing a part of the plurality of input images may be specified, or the product that is recognized in common by analyzing the plurality of input images may be specified.

Furthermore, there is a case where a plurality of products are specified as candidates from an input image representing a single product, depending on the accuracy of the image analysis. In such a case, the specifying unit 102 may specify the product in accordance with a result of analyzing the input image acquired by the image acquiring unit 101 and additional information. The additional information includes (a) a type of product, (b) a size of product, (c) attribute information of the user, (d) purchase history information 120 of the user, or (e) position information. The type and size of the product is an example of attribute information of the product.

(a) Type of Product

The type of product may be inputted, for example, by a voice by using a microphone 28. In this case, the type of product may be acquired by recognizing the inputted voice using a well-known voice recognition technique. Processing of recognizing the voice may be performed in the terminal apparatus 20 or may be performed in the processing server apparatus 30.

For example, the user inputs a voice of "drink" using the microphone 28. Voice data indicating the inputted voice are transmitted from the terminal apparatus 20 to the processing server apparatus 30. The type of product, "drink" is acquired by recognizing the voice indicated by the voice data in the processing server apparatus 30.

Here, it is assumed that the beverage X belonging to the type of "drink" and products belonging to types other than "drink" are specified as candidates as a result of analyzing the input image 200A shown in FIG. 8. As described above, when "drink" is acquired as the type of product, the products having the types other than "drink" are excluded from the candidates. As a result, the beverage X belonging to the type of "drink" is specified among the candidates.

(b) Size of Product

For example, when the input image includes the product image and a reference image indicating an object that is a reference of a size, the size of product may be measured based on the reference image. The reference image may be, for example, an image indicating a user's body or a part of the body, or may be an image indicating an item having a predetermined size. The size of the product represented by the product image is measured based on a ratio of a size of the product image and a size the reference image, and a size of the object represented by the reference image.

As another example, the size of product may be measured by using a plurality of input images that are acquired by photographing the same product from the different distances by the camera 27. In detail, after the image of the product is photographed from a position separated by a certain distance by using the camera 27, the user is requested to photograph the product again from a position moved by a predetermined distance from that position. This request may be performed, for example, by displaying a message of requesting to photograph such the product again on the display 25. This message may be generated in the processing server apparatus 30 and transmitted to the terminal apparatus 20.

When the user photographs the image of the product using the camera 27 again in response to this request, the photographed image is acquired as the additional input image. In detail, image data representing the photographed image are transmitted from the terminal apparatus 20 to the processing server apparatus 30. The image represented by the image data received in the processing server apparatus 30 is used as the additional input image. The initial input image and the additional input image include the product images representing the same product and having the different sizes. The actual size of the product is measured according to a ratio of the sizes of these product images and a difference between the photographing distances of these input images.

As yet another example, the size of product may be inputted by a voice by using the microphone 28 in the same manner as the type of product described above. In this case, the size of product may be acquired by recognizing the inputted voice using a well-known voice recognition technique.

Here, it is assumed that the 450 ml beverage X and the 500 ml beverage X are specified as candidates as a result of analyzing the input image 200A shown in FIG. 8. For example, if the size corresponding to a 500 ml container is measured as the size of the product, the 450 ml beverage is excluded from the candidates. As a result, the 500 ml beverage X is specified among the candidates.

(c) Attribute Information of User

As the attribute information of the user, for example, one included in the user information 110 stored in the storage 24 is used. In this case, the attribute information of the user is read from the storage device 24 in response to a request from the processing server apparatus 30, and is transmitted from the terminal apparatus 20 to the processing server apparatus 30. The tendency of products purchased by the user is determined by analyzing the attribute information of the user. The product may be specified according to the tendency.

Here, it is assumed that a product for women and the 500 ml beverage X are specified as candidates as a result of analyzing the input image 200A shown in FIG. 8. The beverage X is a product that is used regardless of gender. In the example shown in FIG. 4, a sex of "male" is included in the user's attribute information of the user information 110. In this case, since the user is male, it is estimated that a possibility of purchasing the product for women is low. Therefore, the product for women is excluded from the candidates. As a result, the 500 ml beverage X that is used regardless of gender is specified among the candidates.

Whether the product is for women or for men may be determined, for example, by accessing a product page of a candidate product stored in the web server apparatus 10. In detail, when the product page includes information indicating that the product is for women, the candidate product is determined to be for women. On the other hand, when the product page includes information indicating that the product is for men, the candidate product is determined to be for men. When the product page does not include any information, the candidate product is determined to a product that is used regardless of gender.

(d) Purchase History Information of User

The purchase history information 120 of the user is used, for example, by being read from the storage device 34. The tendency of products purchased by the user is determined by analyzing the purchase history information 120. The product may be specified according to the tendency.

Here, it is assumed that the 500 ml beverage X which is a carbonated drink and a beverage which is not carbonated beverage are specified as candidates as a result of analyzing the input image 200A shown in FIG. 8. For example, when the number of times the user has purchased the carbonated beverage is greater than a threshold value, it is determined that the user has the tendency of purchasing the carbonated beverage. In this case, a beverage that is not the carbonated beverage is excluded from the candidates. As a result, the 500 ml beverage X that is the carbonated beverage is specified among the candidates.

(e) Position Information

The position information is information indicating a current position of the terminal apparatus 20. The position information is generated, for example, by a position sensor included in the sensor unit 29. Here, it is assumed that the 500 ml beverage X and a product other than food are specified as candidates as a result of analyzing the input image 200A shown in FIG. 8. The beverage X is food. For example, when the position information indicates a position within a supermarket, it is considered that the user resides in the supermarket. Since the food is sold in the supermarket, it is highly possible that the input image 200 is an image representing food. In this case, the product other than food is excluded from the candidates. As a result, the 500 ml beverage X that is food is specified among the candidates.

Furthermore, depending on the accuracy of the image analysis, there is a case where the type of the product can be specified but the product cannot be specified by analyzing the input image. In such a case, the specifying unit 102 may request the user to input an additional input image including a feature portion corresponding to the specified type of the product and specify the product by analyzing the additional input image inputted in response to this request. The feature portion corresponding to the type of the product is specified by using a feature table 130. The feature table 130 is stored, for example, in the storage device 34 in advance.

Figure 10:
FIG. 10 is a diagram showing an example of a feature table 130.

FIG. 10 is a diagram showing an example of a feature table 130. The feature table 130 stores a type of product and a feature portion of the type of product which are associated with each other. The feature portion is a portion that can specify a product by the image analysis. The feature portion is determined for each type of product in advance. For example, when a feature portion of a product belonging to a type of "drink" is a "label portion," the product type of "drink" and the feature portion of "label portion" are associated with each other and stored.

Here, it is assumed that the product type of "drink" is specified by analyzing the input image 200A shown in FIG. 8. In this case, a feature portion of a product having the type of "drink" is specified using the feature table 130. In the example shown in FIG. 10, since the feature portion of "label portion" is stored in association with the product type of "drink," the feature portion of "label portion" is specified.

In this case, for example, the user is requested to photograph the product again such that the feature portion of "label portion" is included. This request may be performed, for example, by displaying a message of requesting to photograph such the product again on the display 25, in the same manner as the request of photographing the product again as described above. This message may be generated in the processing server apparatus 30 and transmitted to the terminal apparatus 20.

When the user photographs the image of the product using the camera 27 again according to this request such that the image of the product includes "label portion," the photographed image is acquired as the additional input image. In detail, image data representing the photographed image are transmitted from the terminal apparatus 20 to the processing server apparatus 30. The image represented by the image data received in the processing server apparatus 30 is used as the additional input image. The additional input image includes the label portion of the product. The product is specified by analyzing the additional input image.

Further, there is a case where the product cannot be specified by the input image even if the input image is analyzed. In such a case, the specifying unit 102 may request the user to input an additional input image and specify the product by analyzing the additional input image inputted in response to this request. This request may be performed, for example, by displaying a message of requesting to input the additional input image on the display 25, in the same manner as the request of photographing the product again as described above. This message may be generated in the processing server apparatus 30 and transmitted to the terminal apparatus 20.

This message may be, for example, a message of requesting to photograph the whole or a feature portion of the product, or a message of requesting to photograph the product while changing a distance or a direction. When the user photographs the product using the camera 27 in response to this request, image data indicating the photographed image are transmitted from the terminal apparatus 20 to the processing server apparatus 30. An image indicated by the image data received in the processing server apparatus 30 is acquired as the additional input image.

In another example, the specifying unit 102 may request the user to input additional information and may specify the product as a result of analyzing the additional information inputted in response to this request and the input image. This request may be performed, for example, by displaying a message of requesting to input the additional information on the display 25, in the same manner as the request of photographing the product again as described above. This message may be generated in the processing server apparatus 30 and transmitted to the terminal apparatus 20.

This message may be, for example, a message of requesting to input a type or a size of the product as a voice. When the user inputs the voice indicating the type or size of the product, the type or size of the product is acquired by recognizing the inputted voice. Processing of recognizing the voice may be performed in the terminal apparatus 20 or may be performed in the processing server apparatus 30. When the processing of recognizing the voice is performed in the processing server apparatus 30, voice data indicating the user's voice are transmitted from the terminal apparatus 20 to the processing server apparatus 30. Then, the type or size of the product is acquired by recognizing the voice indicated by the voice data by the processing server apparatus 30.

C. Selecting Unit 103

The selecting unit 103 is realized, for example, by executing a server program stored in a memory 32 by a processor 31. When an input image includes a plurality of product images, the selecting unit 103 selects a product from among a plurality of products specified according to the plurality of product images. The selection of the product may be performed, for example, according to positions, sizes, or focusing conditions of the plurality of product images in the input image.

For example, the product images 201 and 202 are included in the input image 200B shown in FIG. 9. Here, it is assumed that the beverage X is specified from the product image 201 and the beverage Y is specified from the product image 202. The product image 201 is located as a center of the input image 200B and the product image 202 is located at the end of the input image 200B. In this case, a product intended by the user is considered to the beverage X indicated by the product image 201 that is located as the center of the input image 200B. Therefore, the beverage X indicated by the product image 201 may be selected from among the beverages X and Y specified from the input image 200B.

As another example, in the input image 200B shown in FIG. 9, the product image 201 is larger than the product image 202. In this case, a product intended by the user is considered to the beverage X indicated by the product image 201 having the larger size. Therefore, the beverage X indicated by the product image 201 may be selected from among the beverages X and Y specified from the input image 200B.

As yet another example, it is assumed that the product image 202 is focused and the product image 201 is out of focus in the input image 200B shown in FIG. 9. Whether an image is focused or out of focus is determined, for example, according to an amount of change in the luminance difference in the image. In this case, a product intended by the user is considered to the beverage Y indicated by the product image 202 being focused. Therefore, the beverage Y indicated by the product image 202 may be selected from among the beverages X and Y specified from the input image 200B.

As another example, the selecting unit 103 may select the product in accordance with an operation of the user. In detail, a screen showing a list of a plurality of products specified by the specifying unit 102 is generated and screen data indicating the generated screen are transmitted from the processing server apparatus 30 to the terminal apparatus 20. The screen indicated by the screen data received by the terminal apparatus 20 is displayed on the display 25. The user performs an operation of selecting a desired product from among the products included in the screen displayed on the display 25. This operation is, for example, a touching operation. Identification information of the product that is selected by the user in accordance with the operation is transmitted from the terminal apparatus 20 to the processing server apparatus 30. When the processing server apparatus 30 receives the identification information of the product, the product indicated by the identification information is selected.

The selection of the product by the selecting unit 103 may not be necessarily performed. Even if the input image includes the plurality of product images, the selection of the product may not be performed.

D. Page Acquiring Unit 104

The page acquiring unit 104 is realized, for example, by a communication interface 23 under a control of a processor 21. The page acquiring unit 104 acquires from a web server apparatus 10 a product page of a product specified by a specifying unit 102 or a product selected by a selecting unit 103. The product page includes information of the product. The information of the product may be, for example, a product image 12 or product information 13 shown in FIG. 2. However, the information of the product is not limited to the product image 12 or the product information 13 as shown in FIG. 2, but may any information as long as it is information on the product.

In detail, the page acquiring unit 104 transmits a request for acquiring data of the product page to a plurality of web server apparatuses 10. If page data indicating the product pages are transmitted from the web server apparatuses 10 to the terminal apparatus 20 in accordance with the request, the terminal apparatus 20 receives the page data. The page acquiring unit 104 acquires the product pages indicated by the received page data. For example, when the 500 ml beverage X is sold at EC sites A to C and the product pages of the beverage X are stored in the web server apparatuses 10A to 10C, the product page of the beverage X is acquired from each of the web server apparatuses 10A to 10C.

When a target product is sold at only a single EC site and a product page of this product is stored in only a single web server apparatus 10, the product page may be acquired from that web server apparatus 10.

As another example, instead of acquiring a product page of a product specified by the specifying unit 102, the page acquiring unit 104 may acquire a product page of another product corresponding to that product. For example, when a model of the product specified by the specifying unit 102 is changed, a product page of a product after the model change may be acquired. In this case, a conversion table 140 is stored in a storage device 34.

FIG. 11 is a diagram showing an example a conversion table 140. In the conversion table 140, identification information of a target product and identification information of a corresponding product are stored in association with each other. The identification information of the target product is information of uniquely identifying the target product. As the identification information of the target product, for example, a product name of the target product may be used or a product number of the target product may be used. The identification information of the corresponding product is information of uniquely identifying the corresponding product. As the identification information of the corresponding product, for example, a product name of the corresponding product may be used or a product number of the corresponding product may be used. The corresponding product is another product corresponding to the target product. The corresponding product is, for example, a product after the model change of the target product.

Here, it is assumed that the beverage X is specified by the specifying means 102. In an example shown in FIG. 11, the beverage X and a new beverage X are stored in association with each other. In this case, a product page of the new beverage X is acquired from the web server apparatus 10. In detail, the page acquiring unit 104 transmits a request for acquiring data of a product page of the new beverage X to the web server apparatus 10 that provides an EC site selling the new beverage X. When page data indicating the product page of the new beverage X are transmitted from the web server apparatus 10 to the terminal apparatus 20 in response to this request, the terminal apparatus 20 receives the page data. The page acquiring unit 104 acquires the product page indicated by the received page data.

E. Generating Unit 105

The generating unit 105 is realized, for example, by executing a client program stored in a memory 22 by a processor 21. The generating unit 105 generates a screen in which page images corresponding to pages acquired by a page acquiring unit 104 are arranged side by side.

The page image is, for example, a thumbnail of the page. The thumbnail may be a thumbnail of the whole of the page, or may be a thumbnail of a part of the page. For example, when a size of the thumbnail is less than or equal to a threshold value, the thumbnail of the part of the page may be used. The threshold value may be, for example, set to such a size that it is difficult to visually recognize information in the thumbnail. At this time, a portion including predetermined information in the page may be cut out and a thumbnail of this portion may be generated. The predetermined information may be, for example, information necessary for identifying the product, such as a product image or a product name, or information, which may be different between EC sites, such as a price of the product. The page image is not limited to an image representing the page itself, but may be any image as long as it corresponds to the page.

Further, a link to a product page of a corresponding EC site is added to the page image. Furthermore, a name of the corresponding EC site or predetermined information included in the product page may be described near each page image. The predetermined information may be, for example, information necessary for identifying the product, such as a product name, or information, which may be different between EC sites, such as a price of the product.

An arrangement order of the page images may be a predetermined order, or may be an order corresponding to prices of products included in each product page. For example, the page images may be arranged side by side in descending order of the prices of the corresponding products.

As another example, the arrangement order of the page images may be an order according to the tendency of the EC sites, which are used by the user, determined from the purchase history information 120 of the user or the attribute information of the user. The purchase history information 120 is used, for example, by being read from the storage device 34. The attribute information of the user uses, for example, one included in the user information 110 stored in the storage device 24. In this case, the attribute information of the user is read from the storage device 24 in response to a request from the processing apparatus 30 and is transmitted from the terminal apparatus 20 to the processing apparatus 30.

For example, when the attribute information of the user shown in FIG. 4 includes information indicating that a favorite EC site of the user is an EC site A or information indicating that the user has account information of the EC site A, it is determined that the user has the tendency of using the EC site A. In the purchase history information 120 shown in FIG. 6, when the number of times the user purchases products at the EC site A is greater than a threshold value, it is determined that the user has the tendency of using the EC site A. In this case, the order of the page image corresponding to the EC site A may be determined to "1" and the orders of the page images corresponding to the other EC sites may be determined to be lower.

Figure 12:
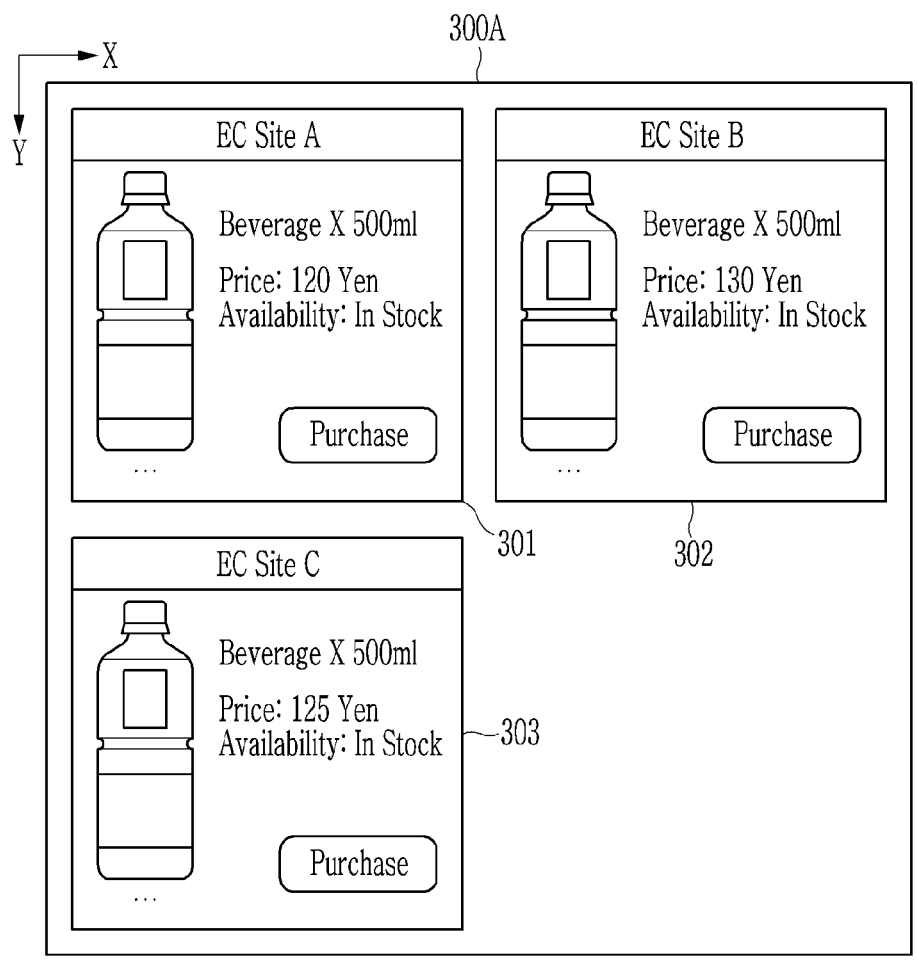
FIG. 12 is a diagram showing a screen 300A.

FIG. 12 is a diagram showing a screen 300A which is an example of a screen. Here, it is assumed that the product pages of the beverage X included in the EC sites A-C are acquired. In this case, the page images 301-303 are generated from these product pages. As described above, when it is determined that the user has the tendency of using the EC site A, for example, the order of the page image 301 corresponding to the EC site A is determined to "1" and the orders of the page images 302 and 303 corresponding to the EC sites B and C is determined to be lower. Here, it is assumed that the order of the page image 302 is determined to "2" and the order of the page image 303 is determined to "3." In this case, the page images 301-303 are arranged in the order of the page image 301, the page image 302, and the page image 303.

In this example, the page images 301-303 are arranged along a direction of an arrow X in the drawing starting from the upper left of the screen 300A, and, upon reaching the end of the X direction in the drawing, move in a direction of an arrow Y in the drawing and are arranged along the direction of the arrow X in the drawing again.

As yet another example, the arrangement order of the page images may be an order according to the tendency of the products, which are purchased by the user, determined from the purchase history information 120 of the user or the attribute information of the user. The purchase history information 120 is used, for example, by being read from the storage device 34. The attribute information of the user uses, for example, one included in the user information 110 stored in the storage device 24. In this case, the attribute information of the user is read from the storage device 24 in response to a request from the processing apparatus 30 and is transmitted from the terminal apparatus 20 to the processing apparatus 30.

For example, when a sex of "male" is included in the attribute information of the user shown in FIG. 4, it is estimated that a possibility of purchasing the product for women by the user is low. In this case, the order of the page image corresponding to the product for women may be determined to be lower than the order of the page image corresponding to the product that is used regardless of gender.

Figure 13:
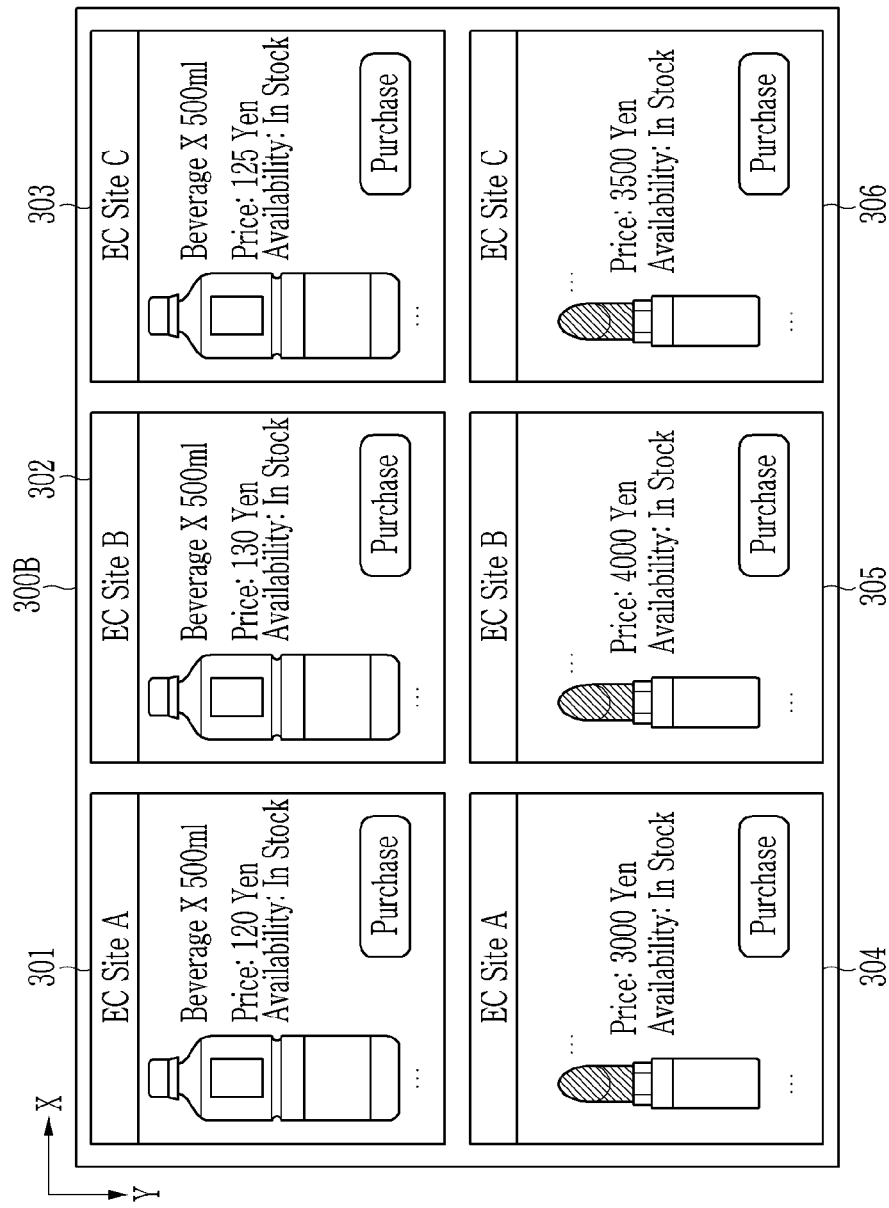
FIG. 13 is a diagram showing a screen 300B.

FIG. 13 is a diagram showing a screen 300B that is an example of a screen. Here, it is assumed that the product pages of the beverage X and the product pages of the product for women, which are included in the EC sites A-C, are acquired. In this case, the page images 301-306 are generated from these product pages. Among these page images 301-306, the page images 301-303 correspond to the product pages of the beverage X and the page images 304-306 correspond to the product pages of the product for women.

As described above, when it is estimated that the possibility of purchasing the product for women by the user is low, for example, the orders of the page images 304-306 corresponding to the product for women are determined to be lower than the orders of the page images 301-303. Here, it is assumed that the orders of the page images 301-303 are determined to "1," "2," and "3," respectively, and the orders of the page images 304-306 are determined to "4," "5," and "6," respectively. In this case, the page images 301-306 are arranged in the order of the page image 301, the page image 302, the page image 303, the page image 304, the page image 305, and the page image 306.

In this example, as in the example shown in FIG. 12, the page images 301-306 are arranged along a direction of an arrow X in the drawing starting from the upper left of the screen 300B, and, upon reaching the end of the X direction in the drawing, move in a direction of an arrow Y in the drawing and are arranged along the direction of the arrow X in the drawing again.

A scheme of determining the order is not limited to the above-described example. For example, the order may be determined based on both the tendency of the EC sites used by the user and the tendency of the products purchased by the user.

Further, the arrangement of page images is not limited to the example shown in FIG. 12 or FIG. 13. For example, the page images may be arranged in a line along the direction of the arrow X or the direction of the arrow Y in the drawing. Furthermore, when the number of page images is large such that the page images cannot be included in one screen, only a predetermined number of page images may be displayed and the remaining page images may be displayed by scrolling operation.

F. Display Control Unit 106

The display control unit 106 is realized, for example, by executing a client program stored in a memory 22 by a processor 21. The display control unit 106 displays a screen generated by a generating unit 105 on a display 25.

2. Operation

Figure 14:
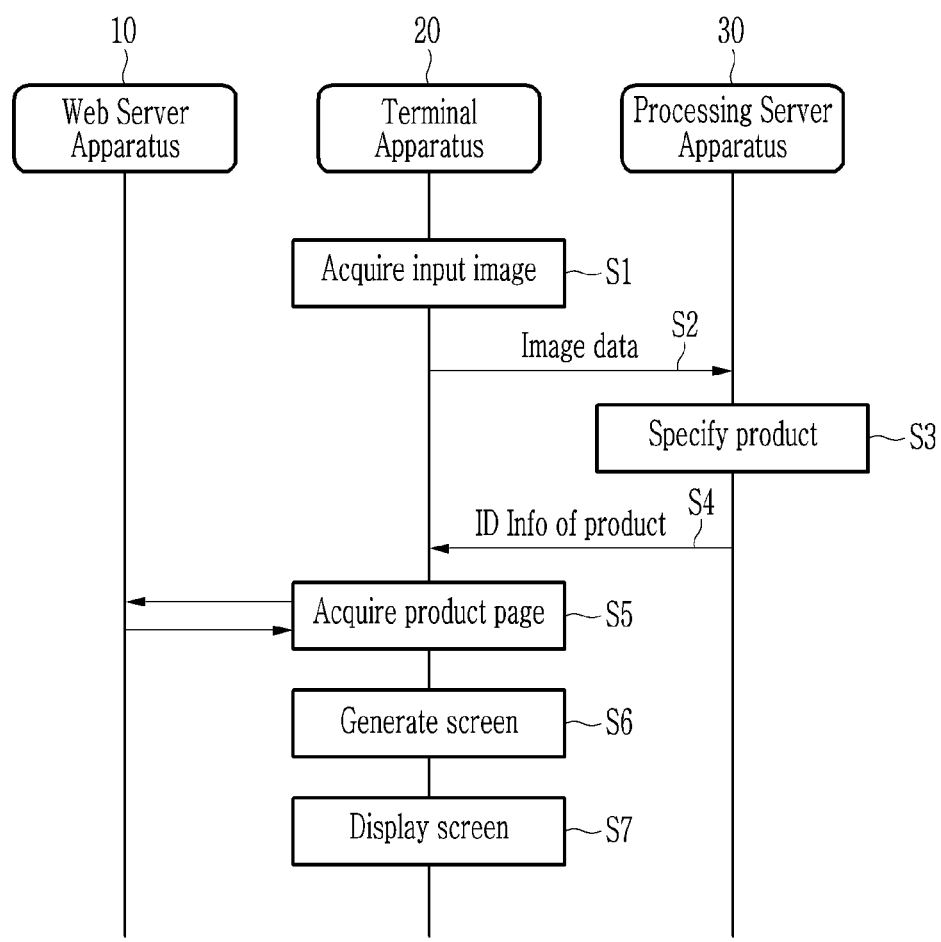
FIG. 14 is a flowchart showing an example of processing of an information providing system 1.

FIG. 14 is a flowchart showing an example of processing of an information providing system 1. This processing is started, for example, by performing an operation of inputting an input image by a user.

In step S1, an image acquiring unit 101 acquires an input image representing a product. For example, when a user photographs 500 ml beverage X using a camera 27, an input image 200A shown in FIG. 8 is acquired. This input image 200A includes a product image 201 representing the beverage X.

In step S2, image data indicating the input image acquired in step S1 are transmitted from a terminal apparatus 20 to a processing server apparatus 30. The image acquiring unit 101 acquires the input image indicating the image data received from the terminal apparatus 20.

In step S3, a specifying unit 102 specifies a product represented by the input image by analyzing the input image that is indicated by the image data received from the terminal apparatus 20. For example, when the input image 200A shown in FIG. 8 is analyzed, the 500 ml beverage X represented by the product image 201 is specified.

In step S4, identification information of the product specified in step S3 is transmitted from the processing server apparatus 30 to the terminal apparatus 20. For example, when the 500 ml beverage X is specified in step S3, identification information of this beverage X is transmitted.

In step S5, a page acquiring unit 104 acquires from a web server apparatus 10 a product page of the product that is identified by the identification information received from the processing server apparatus 30. For example, when the 500 ml beverage X is sold at EC sites A-C, product pages of this beverage X are acquired from web server apparatuses 10A-10C providing these EC sites.

In detail, the page acquiring unit 104 transmits a request for acquiring data of a product page of the 500 ml beverage X to the web server apparatuses 10A-10C. The web server apparatuses 10A-10C transmits page data indicating the stored product pages of the 500 ml beverage X to the terminal apparatus 20. The page acquiring unit 104 acquires the product pages indicated by the page data received from the web server apparatuses 10A-10C.

In step S6, a generating unit 105 generates a screen in which page images corresponding to product pages acquired in step S6 are arranged side by side. For example, as shown in FIG. 12, a screen 300A in which page images 301-303 indicating the product pages of the beverage X are arranged side by side are generated.

In step S7, a display control unit 106 displays the screen generated in step S6 on a display 25. For example, the screen 300A shown in FIG. 12 is displayed on the display 25.

As shown in FIG. 12, the screen 300A includes the page images 301-303 indicating the product pages of the beverage X. The page images 301-303 include prices of the beverage X in EC sites A, B, and C, respectively. The user can easily compare the prices of the beverage X at the EC sites A-C by browsing the screen 300A.

When the user purchases the 500 ml beverage X at the EC site A after the screen 300A is displayed, the user performs an operation of selecting the page image 301. This operation is, for example, a touching operation. The terminal apparatus 20 accesses a linked destination added to the page image 301 in response to this operation. Accordingly, the product page of the beverage X included in the EC site A is displayed. The user proceeds to an order screen and performs a predetermined procedure such as inputting predetermined order information, thereby purchasing the 500 ml beverage X by electronic commerce.

At this time, without performing a new login operation at the EC site A of the linked destination, the user may be automatically logged into the EC site A based on user authentication of the terminal apparatus 20. In this case, authentication information used for the user authentication of the terminal apparatus 20 and account information of each EC site are stored in a storage device 24 in association with each other. The account information is permitted to be used when the user authentication using the authentication information is successful.

For example, when a web server apparatus 10A providing the EC site A is accessed in response to the operation of selecting the page image 301 as described above, account information of the EC site A is read and transmitted to the web server apparatus 10A. Processing of logging into the EC site A by using this account information is performed. Accordingly, the login operation of the user can be omitted.

In another example, another order screen 400 different from the order screen included in each EC site may be displayed on the display 25 in response to the operation of selecting the page image 301.

Figure 15:
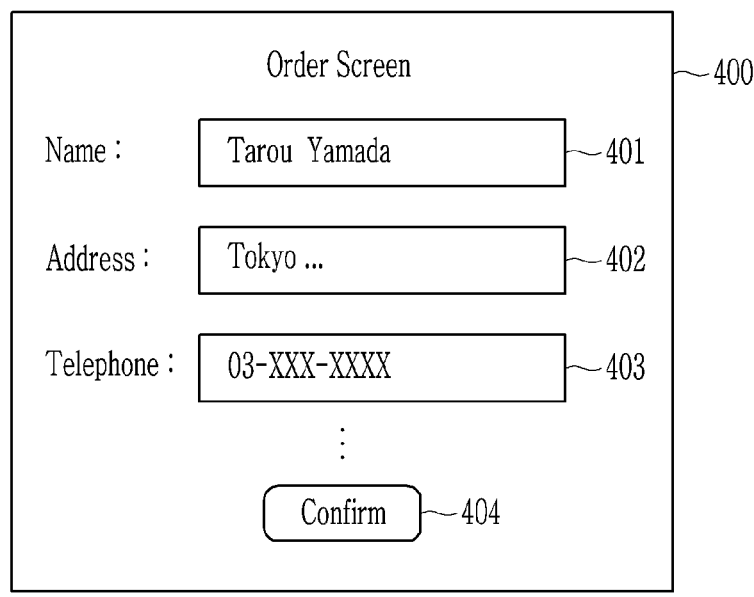
FIG. 15 is a diagram showing an example of an order screen 400.

FIG. 15 is a diagram showing an example of an order screen 400. The order screen 400 includes a name input field 401, an address input field 402, a telephone number input field 403, and a confirm button 404. For example, a name, an address, and a telephone number included in user information 110 stored in a storage device 24 may be entered in the name input field 401, the address input field 402, and the telephone number input field 403, respectively.

Further, in another example, a position indicated by position information, which is selected from a history of position information of the terminal apparatus 20, may be input to the address input field 402 as an address. In this case, the history of the position information generated by a positioning sensor included in a sensor unit 29 is stored in the storage device 24. The history of the position information stored in the storage device 24 is displayed on the display 25. The user performs an operation of selecting the position information indicating a delivery place of the purchased product from the history. This operation is, for example, a touching operation. When the position information is selected by this operation, an address of the position indicated by the selected position information is inputted to the address input field 402.

When the user performs an operation of pressing the confirm button 404 after information necessary for purchasing the product is inputted as described above, order information of the product is transmitted to the web server apparatus 10 providing the EC site. The order information includes information inputted in the order screen 400. Accordingly, the user can perform the procedure of purchasing the product without accessing the EC site. Further, since at least a part of information necessary for ordering the product is automatically inputted without the operation of the user, the burden of the operation of inputting the information is reduced.

According to the present embodiment, a page including information of a product is displayed by merely inputting an input image representing the product. Therefore, even if the user does not recognize information for identifying the product, the user can browse the page including the information of the product. Further, since the user does not need to access each EC site and to perform an operation of searching for the product, the user can browse the page including the information of the product by the simpler operation. In particular, when the products is sold at a plurality of EC sites, the operation burden on the user is reduced because the user does not need to access these EC sites and to repeatedly perform the operation of searching for the product.

Furthermore, in the present embodiment, the accuracy of specifying the product is improved by specifying the product using additional information or an additional input image in addition to a result of analyzing the input image. Moreover, in the present embodiment, since the page images are arranged side by side, information of the products in the respective EC sites can be easily compared.

3. Modified Examples

The present invention is not limited to embodiments described above. The embodiments may be modified as described below. Further, the below modified examples may be combined.

In embodiments described above, a request to input an additional input image or additional information may be implemented by means other than a message display. For example, this request may be performed by a voice, a light, or a vibration. For example, when a terminal apparatus 20 has a speaker, a voice of requesting to input the additional input image or the additional information may be outputted from the speaker. Further, this request may be performed by flickering an LED (light emitting diode) provided in the terminal apparatus 20 or vibrating casing of the terminal apparatus 20 together with the message display or the voice output.

In embodiments described above, a scheme of displaying page images may be modified according to the tendency of EC sites, which are used by the user, or the tendency of the products, which are purchased by the user, determined from purchase history information 120 of the user or attribute information of the user. The displaying scheme includes changing a size or color of the page image or adding an additional image. In this case, priorities are given to the page images according to the tendency of EC sites which are used by the user or the tendency of the products which are purchased by the user.

The scheme of displaying the page images are changed according to the priorities. For example, the higher the priority, the greater the size of the page image may be. In another example, the lower the priority, the lower the chroma of the page image or the higher the transparency of the page image. In yet another example, an additional image that attracts eyes of the user, such as an additional image on which a word of "recommendation" is described, may be added to a page image having the highest priority.

In embodiments described above, a client program or a server program for realizing functions of the information providing system 1 may be executed by a single processor 21 or 31, or may be executed two or more processors 21 or 31 simultaneously or sequentially.

An object on which the functions of the information providing system 1 shown in FIG. 7 are implemented is merely an example and is not limited thereto. In an example shown in FIG. 7, a part of the functions implemented by the terminal apparatus 20 may be implemented on the processing server apparatus 30, or a part of the functions implemented by the processing server apparatus 30 may be implemented on the terminal apparatus 20. All the functions of the information providing system 1 may be implemented on the terminal apparatus 20. In this case, the terminal apparatus 20 functions as an information providing apparatus. Further, a part of the functions of the information providing system 1 may be implemented on an apparatus other than the terminal apparatus 20 and the processing server apparatus 30.

The steps of processing performed in the information providing system 1 are not limited to an example described in the above embodiment. The steps of this processing may be interchanged if there is no contradiction. Further, the present invention may be provided as a method including the steps of processing performed in the information providing system 1.

The present invention may be provided as a program executed on the terminal apparatus 20 or the processing server apparatus 30. This program may be downloaded via a network such as the Internet. In addition, the program may be provided in a state recorded in a computer-readable recording medium such as a magnetic recording medium (a magnetic tape, a magnetic disk, etc.), an optical recording medium (an optical disk, etc.), a magneto-optical recording medium, or a semiconductor memory.

What is claimed is:

1. An information providing system comprising:
one or more processors that:
acquire an image representing a product and acquire an additional image inputted by a user in response to a request to the user;
specify a plurality product candidates by analyzing the acquired image;
receive position information indicating a current position of the terminal apparatus from a user apparatus of the user, the position information being acquired by a GPS (global positioning system) receiver provided in the terminal apparatus based on signals received from GPS satellites;
determine a place corresponding to a position indicated by the position information;
determine a product candidate not relevant to the place among the plurality of product candidates;
specify the product by excluding the product candidate not relevant to the current position from the plurality of product candidates; and
when failing to specify the product by analyzing the acquired image, specify a type of the product by analyzing the acquired image, request the user to input the additional image including a feature portion of the product, the feature portion being predetermined for the specified type, and specify the product by analyzing the acquired additional image;
a communication interface that acquires a page from at least one server apparatus providing the page including information of the specified product; and
a display that displays a screen in which a page image corresponding to the acquired page is arranged side by side.

2. The information providing system of claim 1, wherein the page image is a thumbnail of a whole of the page or a thumbnail of a portion including predetermined information in the page.

3. The information providing system of claim 1, wherein the one or more processors specify the product based on additional information and a result of analyzing the image.

4. The information providing system of claim 3, wherein the additional information includes attribute information of a user, purchase history information indicating a history that the user has purchased products in the server apparatus, position information indicating a current position of a terminal apparatus used by the user, or attribute information of the product.

5. The information providing system of claim 3, wherein the additional information includes attribute information of the product, and
wherein the attribute information of the product is acquired by recognizing a voice inputted by using a microphone.

6. The information providing system of claim 1, wherein the communication interface acquires a plurality of pages including the information of the specified product from a plurality of server apparatuses, and
wherein a plurality of page images corresponding to the plurality of acquired pages are arranged in the screen side by side, in order according to a tendency of server apparatuses used by a user, the tendency being determined from attribute information of the user or purchase history information indicating a history that the user has purchased products at the plurality of server apparatuses.

7. The information providing system of claim 1, wherein the image represents a plurality of products, wherein the one or more processors specify the plurality of products, wherein the one or more processors acquire a plurality of pages that include information of the plurality of specified products, respectively, and wherein a plurality of page images corresponding to the plurality of acquired pages are arranged in the screen side by side, in order according to a tendency of products purchased by a user, the tendency being determined from attribute information of the user or purchase history information indicating a history that the user has purchased products at the server apparatus.

8. The information providing system of claim 1, wherein the one or more processors acquire a page including information of another product corresponding to the specified product.

9. The information providing system of claim 1, wherein the image includes a plurality of product images representing a plurality of products, wherein the one or more processors specify the plurality of products, wherein the one or more processors select the product from among the plurality of specified products in accordance with positions, sizes, or focusing conditions of the plurality of product images in the image, and wherein the communication interface acquires the page including information of the selected product.

10. An information providing apparatus comprising:
one or more processors that:
   acquire an image representing a product and acquire an additional image inputted by a user in response to a request to the user;
   specify a plurality product candidates by analyzing the acquired image;
   receive position information indicating a current position of the terminal apparatus from a user apparatus of the user, the position information being acquired by a GPS (global positioning system) receiver provided in the terminal apparatus based on signals received from GPS satellites;
   determine a place corresponding to a position indicated by the position information;
   determine a product candidate not relevant to the place among the plurality of product candidates;
   specify the product by excluding the product candidate not relevant to the current position from the plurality of product candidates; and
   when failing to specify the product by analyzing the acquired image, specify a type of the product by analyzing the acquired image, request the user to input the additional image including a feature portion of the product, the feature portion being predetermined for the specified type, and specify the product by analyzing the acquired additional image; and
a communication interface that acquires a page from at least one server apparatus providing the page including information of the specified product,
wherein the one or more processors display a screen in which a page image corresponding to the acquired page is arranged side by side.

11. An information providing method performed by one or more computing devices comprising:
   acquiring an image representing a product and acquiring an additional image inputted by a user in response to a request to the user;
   specifying a plurality product candidates by analyzing the acquired image;
   receiving position information indicating a current position of the terminal apparatus from a user apparatus of the user, the position information being acquired by a GPS (global positioning system) receiver provided in the terminal apparatus based on signals received from GPS satellites;
   determining a place corresponding to a position indicated by the position information;
   determining a product candidate not relevant to the place among the plurality of product candidates;
   specifying the product by excluding the product candidate not relevant to the current position from the plurality of product candidates;
   when failing to specify the product by analyzing the acquired image, specifying a type of the product by analyzing the acquired image, requesting the user to input the additional image including a feature portion of the product, the feature portion being predetermined for the specified type, and specifying the product by analyzing the acquired additional image;
   acquiring a page from at least one server apparatus providing the page including information of the specified product; and
   displaying a screen in which a page image corresponding to the acquired page is arranged side by side.

12. A non-transitory computer-readable medium that stores a program for causing a computer to execute to:
   acquire an image representing a product and acquire an additional image inputted by a user in response to a request to the user;
   specifying a plurality product candidates by analyzing the acquired image;
   receiving position information indicating a current position of the terminal apparatus from a user apparatus of the user, the position information being acquired by a GPS (global positioning system) receiver provided in the terminal apparatus based on signals received from GPS satellites;
   determining a place corresponding to a position indicated by the position information;
   determining a product candidate not relevant to the place among the plurality of product candidates;
   specifying the product by excluding the product candidate not relevant to the current position from the plurality of product candidates;
   when failing to specify the product by analyzing the acquired image, specify a type of the product by analyzing the acquired image, request the user to input the additional image including a feature portion of the product, the feature portion being predetermined for the specified type, and specify the product by analyzing the acquired additional image;
   acquire a page from at least one server apparatus providing the page including information of the specified product; and
   display a screen in which a page image corresponding to the acquired page is arranged side by side.

13. The information providing system of claim 1, further comprising a storage device that stores a table in which a plurality of product types are associated a plurality of feature portions respectively, each of the feature portions being predetermined to be used to specify a corresponding product by image analysis,
   wherein the one or more processors specify the feature portion predetermined for the specified type by referring to the table when failing to specify the product by analyzing the acquired image.

14. The information providing system of claim 10, further comprising a storage device that stores a table in which a plurality of product types are associated a plurality of feature portions respectively, each of the feature portions being predetermined to be used to specify a corresponding product by image analysis,
    wherein the one or more processors specify the feature portion predetermined for the specified type by referring to the table when failing to specify the product by analyzing the acquired image.

15. The information providing method of claim 11, further comprising specifying the feature portion predetermined for the specified type when failing to specify the product by analyzing the acquired image, the feature portion being specified by referring to a table in which a plurality of product types are associated a plurality of feature portions respectively, each of the feature portions being predetermined to be used to specify a corresponding product by image analysis.

16. The information providing method of claim 12, wherein the program causes the computer to further execute specifying the feature portion predetermined for the specified type when failing to specify the product by analyzing the acquired image, the feature portion being specified by referring to a table in which a plurality of product types are associated a plurality of feature portions respectively, each of the feature portions being predetermined to be used to specify a corresponding product by image analysis.

\* \* \* \* \*